United States Patent
Lehr et al.

(10) Patent No.: US 8,611,390 B2
(45) Date of Patent: Dec. 17, 2013

(54) GAS LASER HAVING RADIAL AND AXIAL GAS BEARINGS

(75) Inventors: Andreas Lehr, Edlibach (CH); Patrick Bon, Horgen (CH); Kenworthy Molyneaux Alexander, Chavannes (CH)

(73) Assignee: TRUMPF Maschinen AG, Baar (CH)

( * ) Notice: Subject to any disclaimer, the term of this patent is extended or adjusted under 35 U.S.C. 154(b) by 0 days.

(21) Appl. No.: 13/565,936

(22) Filed: Aug. 3, 2012

(65) Prior Publication Data

US 2013/0022065 A1 Jan. 24, 2013

Related U.S. Application Data

(63) Continuation of application No. PCT/EP2011/050787, filed on Jan. 20, 2011.

(30) Foreign Application Priority Data

Feb. 3, 2010 (DE) .......................... 10 2010 001 538

(51) Int. Cl.
*H01S 3/22* (2006.01)
*H01S 3/223* (2006.01)

(52) U.S. Cl.
USPC .................... 372/58; 372/55; 372/56; 372/57

(58) Field of Classification Search
USPC ...................................................... 372/55–65
See application file for complete search history.

(56) References Cited

U.S. PATENT DOCUMENTS

| | | | |
|---|---|---|---|
| 3,532,444 A | 10/1970 | Strub | |
| 3,832,084 A | 8/1974 | Maurice | |
| 4,764,086 A * | 8/1988 | Jesinger | 415/112 |
| 5,980,114 A | 11/1999 | Oklejas | |
| 6,316,857 B1 | 11/2001 | Jeong | |
| 6,337,872 B1 * | 1/2002 | Nara et al. | 372/58 |
| 6,577,664 B1 * | 6/2003 | Nara et al. | 372/58 |
| 6,945,697 B2 | 9/2005 | Schuster | |
| 2001/0017877 A1 * | 8/2001 | Sekiguchi et al. | 372/58 |

FOREIGN PATENT DOCUMENTS

| | | |
|---|---|---|
| DE | 3600125 A1 | 7/1987 |
| DE | 29605578 U1 | 8/1996 |
| DE | 10037077 A1 | 2/2002 |
| EP | 0298437 A2 | 1/1989 |
| EP | 1205678 A1 | 5/2002 |
| EP | 2105615 A2 | 9/2009 |
| JP | 6164025 A | 6/1994 |
| JP | 2005155894 A | 6/2005 |

OTHER PUBLICATIONS

EP1205678 translation (pp. 1-8).*

(Continued)

*Primary Examiner* — Jessica Stultz
*Assistant Examiner* — Delma R Forde
(74) *Attorney, Agent, or Firm* — Fish & Richardson P.C.

(57) ABSTRACT

A fan for circulating laser gas in a gas laser, the fan having a shaft which is supported by at least one radial bearing and at least one axial gas bearing. The axial gas bearing has at least two rotating bearing faces, one or both being structured with a groove pattern, and at least two stationary bearing faces that are arranged at both sides of a plate.

25 Claims, 4 Drawing Sheets

(56) References Cited

OTHER PUBLICATIONS

Notification of Transmittal of the translation of the International Preliminary Report on Patentability for corresponding PCT Application No. PCT/EP2011/050787, mailed Aug. 16, 2012, 17 pages.

International Search Report from corresponding PCT Application No. PCT/EP2011/050787, mailed Dec. 23, 2011, 5 pages.

* cited by examiner

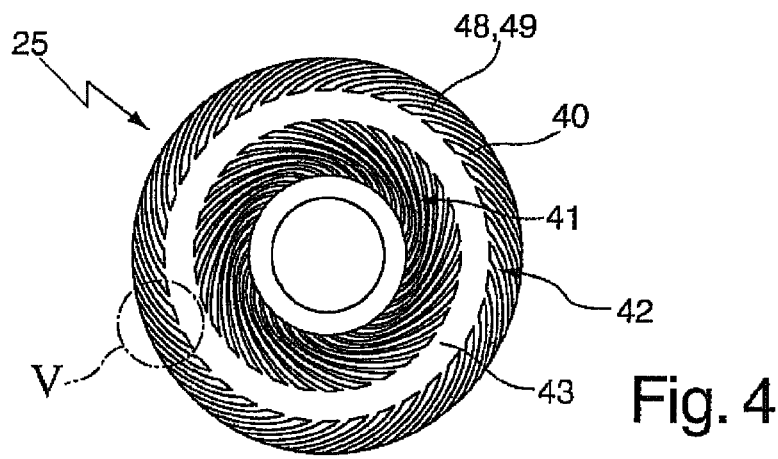
Fig. 4
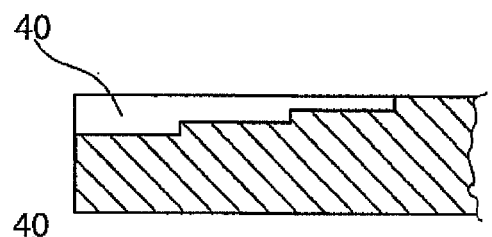
Fig. 5a
Fig. 5b
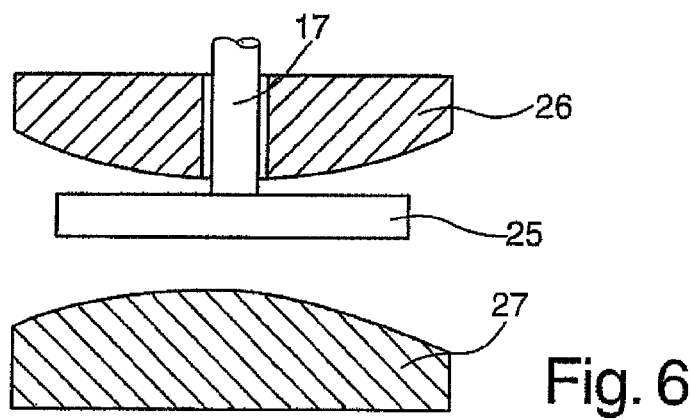
Fig. 6

GAS LASER HAVING RADIAL AND AXIAL GAS BEARINGS

CROSS REFERENCE TO RELATED APPLICATIONS

This application is a continuation of and claims priority under 35 U.S.C. §120 to PCT Application No. PCT/EP2011/050787 filed on Jan. 20, 2011, which claims priority to German Application No. DE 10 2010 001 538.5, filed on Feb. 3, 2010. The contents of both of these priority applications are hereby incorporated by reference in their entirety.

TECHNICAL FIELD

This invention relates to a gas laser having a fan for circulating laser gas, the fan having a shaft which is supported by means of at least one radial bearing and at least one axial gas bearing.

BACKGROUND

Gas lasers and methods for operating them are generally known, for example, from DE 36 00 125 A1. Gas lasers typically include a fan for circulating the laser gas, the fan having a shaft, which is supported by means of at least one radial bearing and at least one axial bearing. In this instance, the bearings may be constructed as electromagnetic bearings. They have great bearing play and a sensor system, actuation system, and an electronic control system are generally provided to establish and control the position of the shaft in an axial or radial direction, since the bearings themselves do not set out any stable position of the shaft in an axial and radial direction. Known methods generally include corresponding logic loops for active control of the position of the shaft.

The shafts may also be constructed with gas bearings. Such a bearing is known from DE 36 00 125 A1. DE 36 00 125 A1 describes a fan for circulating large quantities of gas, in particular for high-power lasers. The fan has a shaft that is supported by two radial gas bearings and an axial gas bearing. The radial gas bearings are constructed as fish-bone air bearings that are supplied with air by a pump, which is formed by helical grooves at the lower side of a radial conveyor. These helical grooves at the upper end of the shaft also act as an axial gas bearing for the shaft. Gas is conveyed by the radial conveyor. In this instance, a problem arises that upwardly directed suction forces and the force of the axial gas bearing act on the radial conveyor. Downwardly directed gravitational force acts counter to these forces, and the two upwardly directed forces become increasingly dominant as the speeds increase. This problem is solved by the use of an additional axial magnetic bearing at the lower end of the shaft. In contrast, at low speeds, the gravitational force is dominant, which is a particular problem when turning the fan on or off. This problem is solved by the use of a compressed air pump, which is arranged to adjust an excess pressure at low speeds or an electromagnet.

SUMMARY

The present disclosure relates to a gas laser with at least one axial bearing that can be configured purely as a gas bearing. The axial gas bearing has two rotating bearing faces and two stationary bearing faces, which are arranged at both sides of a plate, and one or both rotating bearing faces are structured with a groove pattern.

Thus, axial migration of the shaft is advantageously inhibited by means of the gas bearing, which has a simple and compact construction. If the shaft moves in an axial direction, a correspondingly high counter-pressure is produced at the side of the plate of the axial gas bearing facing in the same direction so that the shaft moves back into its original position. If the shaft begins to rotate, gas is conveyed through the grooves, whereby a gas cushion is generated that cushions the shaft in an axial direction. If the speed increases, the pressure of the gas cushion increases so that the shaft is supported in an optimum manner regardless of the speed. The bearing consequently stabilizes itself, thus avoiding the need for a bearing electronic system, sensor system, and actuation system and related components, such as a sensor or actuation cable.

Another advantage of the new bearing systems described herein results from the fact that the bearing play can be kept very small, which is one of the reasons for which gas with a compressibility value in the range from 200 to 600 can be used as a bearing medium. The very small bearing play avoids the need for emergency roller bearings and provides a high level of efficiency. Furthermore, such a bearing system is distinguished by freedom from maintenance, freedom from wear, and temperature insensitivity.

The groove pattern can be constructed as a helical groove pattern. When the shaft begins to rotate, gas is conveyed by the helical grooves, which may form, for example, in an unstructured region that is adjacent in a radial direction to the region provided with the helical grooves, to generate a gas cushion that carries the shaft and/or inhibits its migration.

In another embodiment, the groove pattern of the rotating plate is constructed as a fish-bone groove pattern. In this instance, gas is conveyed both from the outer and from the inner side of the plate at the same time through the grooves, for example, to an unstructured region located between the groove regions that are arranged in a radially offset manner. The terms "outer side" or "inner side" refer in this instance to the radial direction of the plate. This region may be omitted in another embodiment, in which case the grooves convey gas to a circle formed by the intersections of the grooves that extend in an acutely tapered manner towards each other. In these two embodiments, the gas cushion is formed above or below the unstructured region or the circle formed by the intersections of the grooves, which extend in an acutely tapered manner towards each other. In this region, the pressure is at a maximum. Owing to such a configuration of the groove pattern, the bearing properties of the bearing are improved, in particular also with respect to operation at compressibility values of the gas in the range from 200 to 600.

The groove depth can decrease in the direction towards a transition region, which is located between the grooves that are arranged in a radially offset manner relative to each other. In this manner, even at low speeds, pressure can be built up in regions of small groove depth, whereby the shaft lifts off earlier and the start and stop properties of the fan are optimized. At a constant speed, a relatively high pressure is built up, with the conditions otherwise being the same.

In some embodiments, the radial bearing is also constructed as a radial gas bearing, wherein the covering face of the shaft has an axially offset fish-bone groove pattern that may have between the axially offset groove regions, for example, an unstructured face. Gas is conveyed through the two groove regions at the same time to this region so that a region of maximum pressure is formed at this location. These grooves can have a gradient with respect to the groove depth, wherein the groove depth decreases towards the region of maximum pressure. Since a higher pressure can be formed in the regions with relatively shallow grooves, the bearing properties and in particular the start and stop properties of the radial gas bearing are improved in a sustained manner.

The groove depth may decrease in a stepless manner or in steps. The grooves can be machined in a very precise and shallow manner, the depth thereof being, for example, between approximately 5 and 50 microns or 10 and 25 microns, whereby the bearing properties are improved. They can be formed, e.g., in hard metals or ceramic materials, e.g., by means of surface evaporation using an ultra-short pulsed laser. The new methods have the advantage that the material in the grooves is removed in such a manner that no particles can become detached from the material during operation.

In some embodiments, the stationary or the rotating bearing face of the axial gas bearing can be constructed in a convex manner, the convexity being, for example, approximately 1 micron. Consequently, in the regions in which the stationary or the rotating bearing face is flat, a relatively high pressure can build up, whereby the shaft lifts off even at low speeds and the start and stop properties are improved.

In certain embodiments, at least one of the stationary bearing faces of the radial and/or axial bearing can be surrounded in the peripheral direction by one or more annular elements, which leads to an improved orientation or stability of the rotor. In some embodiments, this annular element comprises a resilient material or is an O-ring.

Also described herein are methods for operating a gas laser constructed as described herein, with one or more of the gas bearings being operated both as passive gas bearings and as active gas bearings.

Consequently, according to requirements, the advantages of a passive and an active bearing can be used. During operation as a passive gas bearing, the bearing stabilizes as a function of the speed itself. During operation as an active gas bearing, the bearing properties can be influenced in a selective manner.

In some embodiments, at least one of the bearings can be acted on with external pressure to achieve a pressure (e.g., a precisely defined pressure) that differs from the pressure level of other (e.g., all other) gas bearings in the gas laser. A gas bearing acted on with external pressure as described herein is referred to as an "active gas bearing." With the selective application of pressure to individual bearings, bearing properties, such as, for example, rigidity or damping, can be selectively influenced in each operating state.

In certain embodiments, the pressure which is applied to the bearing(s) which is/are operated as active gas bearing(s) is taken from the pressure side of the fan. This has the advantage that no external pressure gas source is required.

The bearing(s) can be acted on with external pressure by holes whose diameter is, for example, up to 50 microns or up to 100 microns. It is thereby possible to precisely define and control the pressure and the volume flow applied to the bearing(s) so that it is possible, in principle, to avoid the need for an electronic bearing system, sensor system, and an actuator system. It is thus possible to influence the dynamic properties of the bearings at all operating points. The shaft can thus be caused to float, for example, in the idle state or at low speeds.

In some cases, the radial gas bearings are used as a seal against environmental pressure. Owing to the configuration of the rotating bearing face with a fish-bone groove pattern, there is no net mass flow through the bearing and contact-free dynamic sealing is thus obtained that seals against pressure differences in the level of the pressure built up by the grooves. Other sealing means, such as, for example, an O-ring, can be dispensed with. The seal thus described herein can also be used in principle regardless of the use of any other bearing.

Other advantages will be appreciated from the description and the drawings.

The features mentioned above and those set out below can also be used individually or together in any combinations. The embodiments shown and described are not intended to be understood to be a definitive listing but are instead of an exemplary nature.

DESCRIPTION OF DRAWINGS

FIG. 4 is a plan view of a rotating plate of an axial gas bearing shown in FIG. 2.
FIGS. 5a and 5b show two different configurations of grooves in the plate of the axial gas bearing shown in FIG. 4 in a detailed view according to V in FIG. 4.
FIG. 6 shows axial stators of an axial gas bearing shown in FIG. 2.

DETAILED DESCRIPTION

Figure 1:
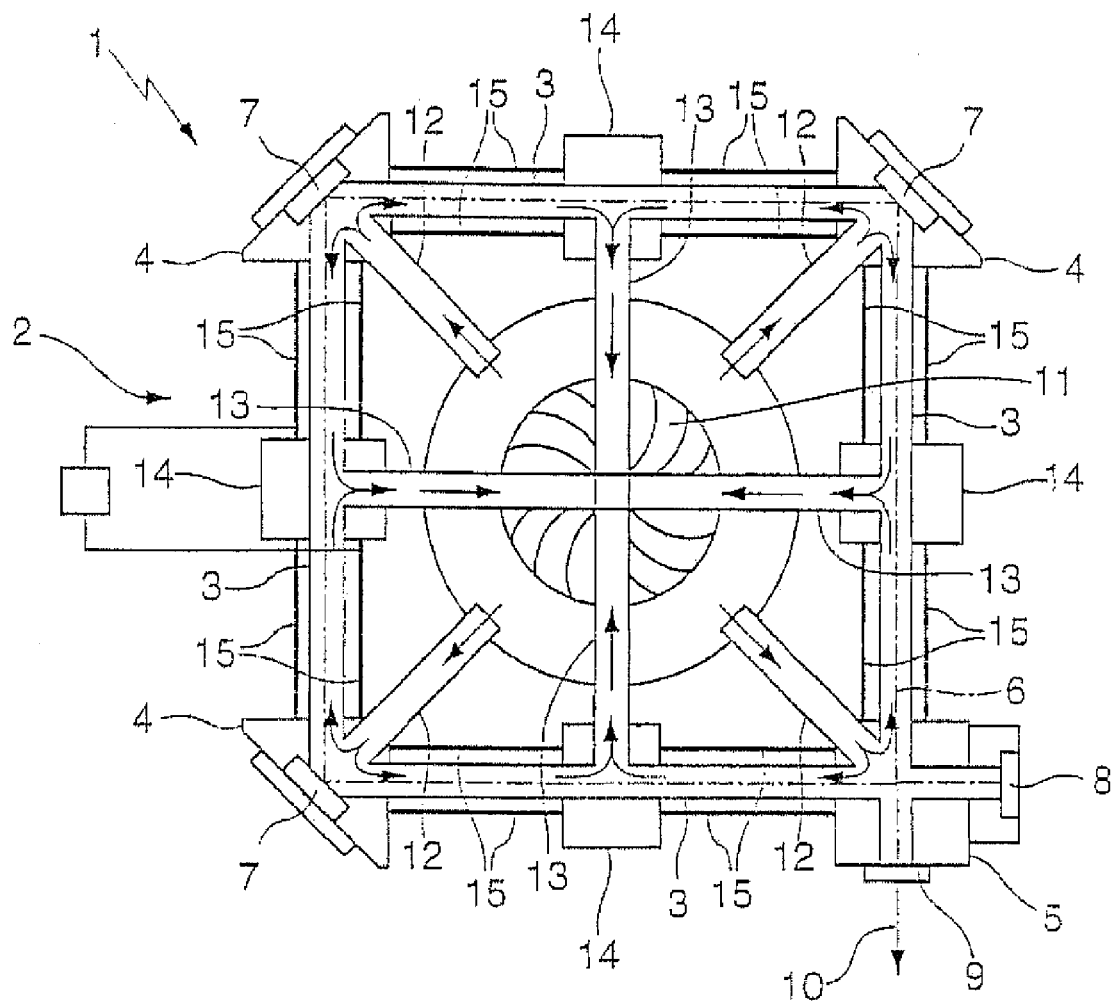
FIG. 1 is a $CO_2$ gas laser with a folded laser resonator.

The $CO_2$ gas laser 1 shown in FIG. 1 has a laser resonator 2, which is folded square and which has four mutually adjacent laser discharge pipes 3 that are connected to each other by means of corner housings 4, 5. A laser beam 6 extends in the direction of the axes of the laser discharge pipes 3 is illustrated with dot-dash lines. Redirection mirrors 7 in the corner housings 4 serve to redirect the laser beam 6 through 90° in each case. A rear mirror 8 and a decoupling mirror 9, which is partially transmissive for the laser wavelength, are arranged in the corner housing 5. The rear mirror 8 is constructed in a highly reflective manner for the laser wavelength and reflects the laser beam 6 through 180° so that it can pass through the laser discharge pipes 3 again in the opposite direction. A portion of the laser beam 6 is decoupled from the laser resonator 2 at the partially transmissive decoupling mirror 9, the other reflected portion remains in the laser resonator 2 and passes once more through the laser discharge pipes 3. The laser beam 10 is decoupled from the laser resonator 2 by means of the decoupling mirror 9. In the center of the folded laser resonator 2 there is arranged as a pressure source for laser gas a radial fan 11, which is connected to the corner housings 4, 5 by means of supply lines 12 for laser gas. Suction lines 13 extend between suction housings 14 and the radial fan 11. The flow direction of the laser gas inside the laser discharging pipes 3 and in the supply and suction lines 12, 13 is indicated with arrows. The laser gas is excited by means of electrodes 15, which are arranged adjacent to the laser discharge pipes 3.

Figure 2:
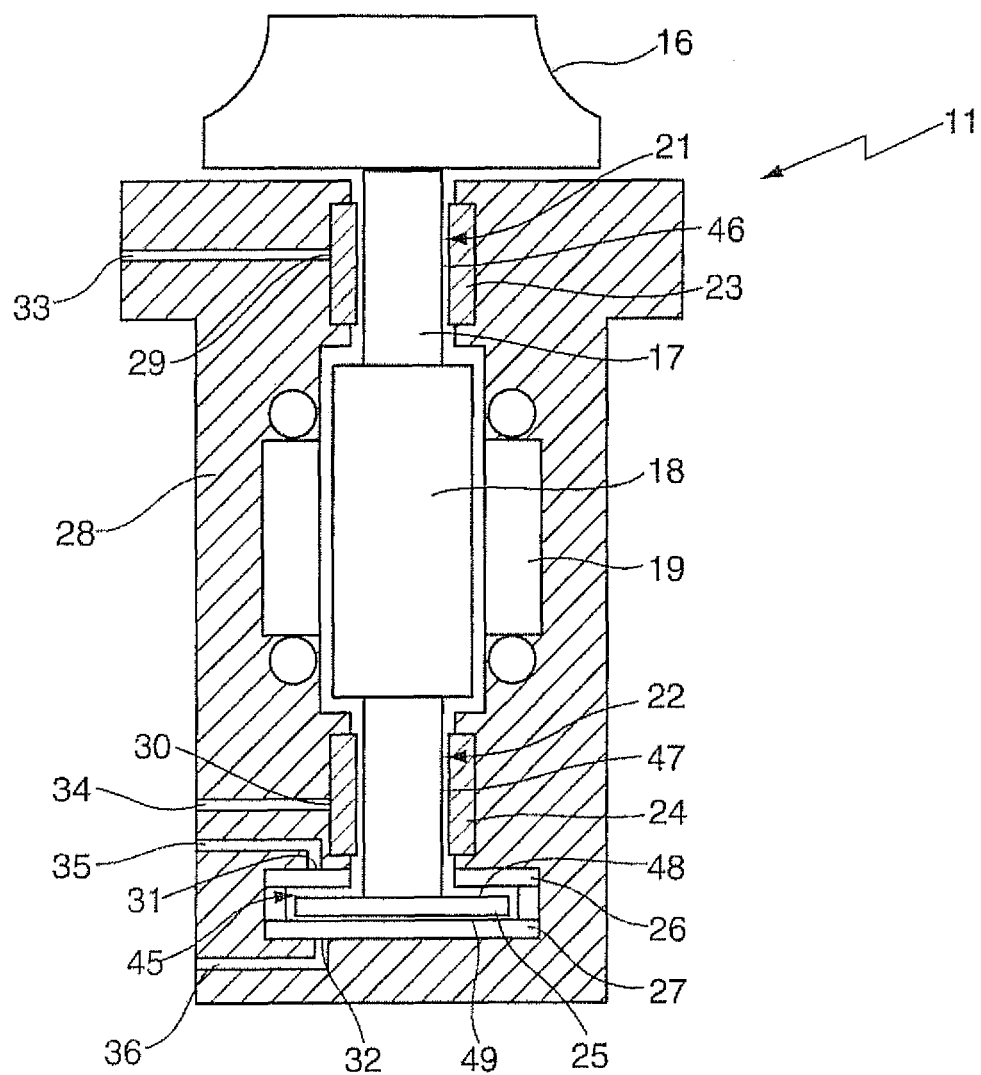
FIG. 2 is a radial fan of a $CO_2$ gas laser.

In the radial fan 11 illustrated in FIG. 2, the laser gas is directed so as to be radially accelerated by the impeller wheel 16 into the supply lines 12 to the corner housings 4, 5. The impeller wheel 16 rests on a shaft 17 that is driven in the central region thereof by a motor, formed by the rotor 18 and stator 19. The region arranged at the outer side of the impeller wheel 16 when viewed from the shaft 17 forms the pressure side of the fan 11. A radial bearing 21 and 22 is arranged in the upper and in the lower region of the shaft 17, the terms upper and lower referring in this instance to the corresponding position of the individual components in the drawing, respectively.

The stationary bearing face is referred to below as a radial stator 23 and 24. The shaft 17 is provided at the lower end thereof with a plate 25, which has a larger diameter than the shaft 17 itself and whose bearing faces 48, 49 form the rotating portion of an axial gas bearing 45 of the shaft 17. The plate 25 is surrounded at the upper and lower side thereof by stationary bearing faces which are referred to below as axial stators 26 and 27 and which are connected to each other in such a manner that the space in which the plate 25 is located is closed in the direction towards the bearing housing 28. The radial or axial stators 23, 24, 26, 27 each have one or more very small holes 29, 30, 31, 32 by means of which they can be connected via one of the channels 33, 34, 35, 36 to a pressure gas source which is not illustrated in greater detail. The diameter of the holes 29, 30, 31, 32 is preferably smaller than 50 microns.

Figure 3A:
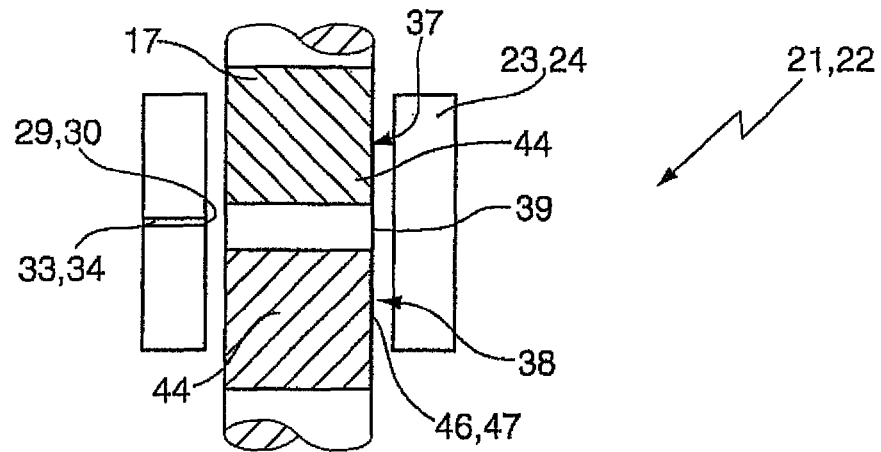
FIGS. 3a and 3b are detailed views of a radial gas bearing shown in FIG. 2.

In FIG. 3a, one of the two radial gas bearings 21 shown in FIG. 2 is illustrated in detail. The shaft 17 is provided with two axially offset regions 37, 38 of inclined grooves, the individual grooves 44 of the two groove regions 37, 38 being located with respect to each other in such a manner that a fish-bone pattern is produced when the two groove regions 37, 38 are considered together. Between the two groove regions 37, 38 of inclined grooves, there is preferably arranged a flat intermediate region 39 which is not provided with grooves. In an embodiment which is not shown, this intermediate region is omitted and the grooves of the two groove regions 37, 38 meet each other at the same axial height at an acute angle. The radial stator 23 or 24 is separated by a narrow gap from the rotating face 46, 47 formed by the shaft. If the shaft 17 now begins to rotate, gas is conveyed through the groove regions 37 and 38 to the flat intermediate region 39. A region (gas cushion) of maximum pressure is formed in this instance between the two groove regions 37 and 38, that is to say, on the flat intermediate region 39, whereby the shaft 17 is radially supported. The pressure relationships of the radial gas bearing along the shaft are consequently divided into a pressure build-up zone in the region of the grooves 37 and 38 and a region of constant maximum pressure in the intermediate region 39. In the radial stators 23 or 24, there are formed in the region of the maximum pressure one or more very small holes 29, 30 through which external pressure can be applied to the bearing via the channels 33, 34.

Figure 3B:
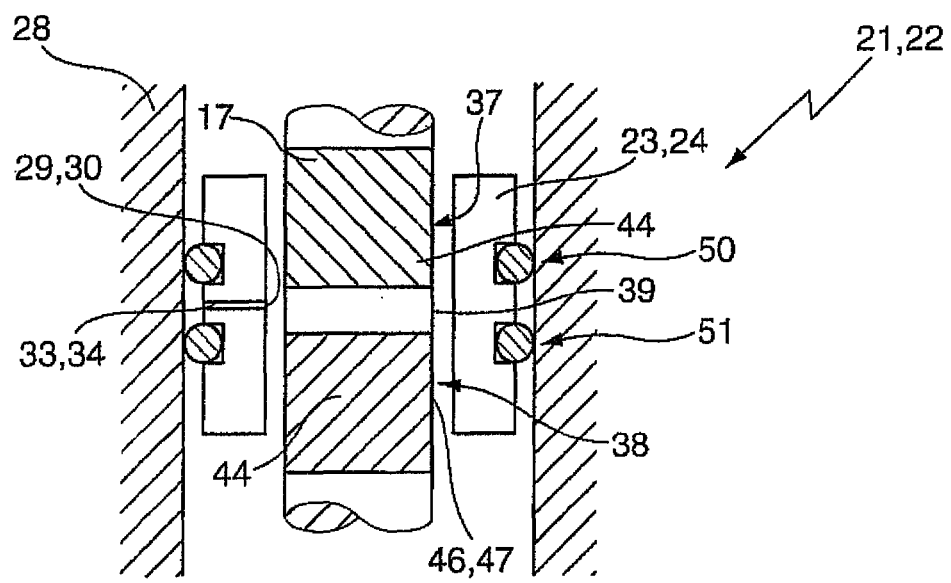

In another embodiment shown in FIG. 3b, the radial stator 23 or 24 is surrounded at the housing side 28 by two annular elements 50, 51 such as, for example, two O-rings, which are each located slightly above or slightly below the outlet channels 33, 34 and seal the radial stator 23 or 24 with respect to the housing side 28. The term above or below refers to the position in the corresponding drawing. In a similar manner, in an embodiment not illustrated, the axial stators 26, 27 are surrounded by one or more annular elements.

FIG. 4 shows the rotating plate 25 of the axial gas bearing 45, which is structured in the same manner at both sides, that is to say, at both rotating bearing faces 48, 49 thereof. Each side has helical grooves 40 that are arranged in two radially offset regions 41, 42. If these two regions are considered together, a fish-bone pattern of opposing helical grooves is produced. Between these two groove regions 41, 42 there is a flat intermediate region 43 that is not provided with grooves. In an embodiment which is not illustrated, this region is omitted and the grooves meet each other in a circle at an acute angle. If the plate 25 begins to rotate, owing to the rotational movement gas is conveyed through the grooves simultaneously both from the outer side and from the inner side to the central flat intermediate region 43, the terms "inner" and "outer" being intended to refer to the central point of the plate or the outer side of the plate 25 in a radial direction. The intermediate region 43 thus forms a region of maximum pressure, whereby the plate 25 and consequently the shaft 17 are axially supported. At a constant speed, this pressure remains the same. The pressure relationships of the axial gas bearing in a radial direction are divided in each case into a pressure build-up zone in the groove regions 41, 42 and an intermediate region 43 of maximum pressure. In the axial stators 26, 27, there are formed in the intermediate region 43 one or more holes 31, 32 through which external pressure can additionally be applied to the bearing.

In an embodiment not illustrated in greater detail, the plate 25 is provided at both sides with a helical pattern of inwardly directed grooves that are adjoined at the center point of the plate by an annular unstructured region.

FIGS. 5a and 5b illustrate two different configurations of the grooves 40, which are provided in the longitudinal direction with a gradient with respect to their depth. In this instance, the groove depth may have one or more steps (FIG. 5a) or extend in a transition-free manner from the level of the shaft or the plate as far as the nominal depth thereof (FIG. 5b). The bearing properties of the axial gas bearing are thereby generally improved, because the regions with shallower groove depth in comparison with regions with deeper grooves have a comparatively high pressure even at comparatively low speeds. Furthermore, the start/stop properties of the axial gas bearing are thus improved since, in the regions of shallower groove depth, pressure is built up even at low speeds.

As shown in FIG. 6, at least one of the two axial stators 26, 27 can be constructed in a slightly convex manner. The contact face of the axial stators 26, 27 with the rotating plate 25 and consequently the start-up resistance are thereby reduced. Owing to the narrow gap, gas is conveyed through the grooves even at low speeds so that there is an earlier build-up of pressure and the speed at which the shaft lifts off is reduced. The same effect can be achieved by the plate 25 being machined at one or both sides in a slightly convex manner.

The radial and axial stators 23, 24, 26, 27 are provided in the region of maximum pressure with one or more very small holes 29, 30, 31, 32 by means of which a precisely defined volume flow can be introduced at a precisely defined pressure so that the shaft 17 is caused to float even in the idle state or at very low speeds.

The radial fan 11 is consequently supported by gas in a bi-directional manner in 5 axes, the pressure level of the bearings adjusting itself as a function of the speed in the some embodiments, that is to say, it can be operated as a purely passive gas bearing. In this operating state, the shaft also lifts off only in accordance with its speed. This is consequently a self-stabilizing bearing, which involves no active control. Owing to the interaction of the advantageous features of the gas laser, such a bearing can be used both in the passive and in the active mode preferably at low pressures (>50 hPa) and very low-density gases (standard density 0.55 kg/m$^3$). The compressibility value of the gas under these conditions is in the range from 200 to 600.

Other Embodiments

A number of embodiments of the invention have been described. Nevertheless, it will be understood that various modifications may be made without departing from the spirit and scope of the invention. Accordingly, other embodiments are within the scope of the following claims.

What is claimed is:
1. A device comprising:
a gas laser; and
a fan coupled to the gas laser and configured to circulate gas in the gas laser, wherein the fan comprises:
a shaft;

a radial bearing comprising:
  a stationary radial gas bearing face; and
    a rotating radial gas bearing face comprising an axially offset fish-bone groove pattern comprising a first groove region and a second groove region separated by a radially central intermediate region devoid of grooves wherein, with reference to the radially central intermediate region devoid of grooves:
      (a) the distal groove depth of a groove in the first groove region of the axially offset fish-bone groove pattern exceeds the proximal groove depth of the groove in the first groove region of the axially offset fish-bone groove pattern, or
      (b) the distal groove depth of a groove in the second groove region of the axially offset fish-bone groove pattern exceeds the proximal groove depth of the groove in the second groove region of the axially offset fish-bone groove pattern, or
      (c) the distal groove depth of a groove in the first groove region of the axially offset fish-bone groove pattern exceeds the proximal groove depth of the groove in the first groove region of the axially offset fish-bone groove pattern and the distal groove depth of a groove in the second groove region of the axially offset fish-bone groove pattern exceeds the proximal groove depth of the groove in the second groove region of the axially offset fish-bone groove pattern; and
  an axial gas bearing, wherein the axial gas bearing comprises:
    two or more stationary axial gas bearing faces;
    two or more rotating axial gas bearing faces, at least one of which is structured with a groove pattern; and
    a plate, wherein at least two of the two or more stationary axial gas bearing faces are arranged at opposite sides of the plate,
  wherein the shaft is supported by the radial bearing and the axial gas bearing.

2. The device of claim 1, wherein the groove pattern is a helical groove pattern.

3. The device of claim 1, wherein the groove pattern is a radially offset fish-bone groove pattern.

4. The device of claim 1, wherein the groove pattern comprises a first groove region and a second groove region separated by a radially central intermediate region devoid of grooves.

5. The device of claim 4, wherein, with reference to the radially central intermediate region devoid of grooves, the distal groove depth exceeds the proximal groove depth in the first groove region or the second groove region or both regions.

6. The device of claim 1, wherein, with reference to the shaft, a distal groove depth of a groove in the groove pattern exceeds a proximal groove depth of the groove in the groove pattern.

7. The device of claim 1, wherein the depth of the groove in the first groove region and/or the depth of the groove in the second groove region decreases in a stepless manner toward the radially central intermediate region devoid of grooves.

8. The device of claim 1, wherein the depth of the groove in the first groove region and/or the depth of the groove in the second groove region decreases in a step-wise manner toward the radially central intermediate region devoid of grooves.

9. The device of claim 1, further comprising an annular element arranged about the stationary radial gas bearing face.

10. The device of claim 9, wherein the annular element comprises a resilient material.

11. The device of claim 1, wherein the depth of a groove in the groove pattern is between 5 microns and 50 microns.

12. The device of claim 1, wherein at least one of the two or more stationary axial gas bearing faces and the two or more rotating axial gas bearing faces comprises a convex surface.

13. The device of claim 1, further comprising an annular element arranged about at least one of the two stationary axial gas bearing faces.

14. The device of claim 13, wherein the annular element comprises a resilient material.

15. A method of operating a gas laser comprising a fan for circulating gas in the gas laser and having an axial gas bearing and a radial bearing, the method comprising:
  operating the axial gas bearing as a passive gas bearing and an active gas bearing, wherein the radial bearing is a radial gas bearing comprising a stationary radial gas bearing face and a rotating radial gas bearing face comprising an axially offset fish-bone groove pattern; and
  providing contact-free dynamic sealing via the rotating radial gas bearing face with respect to pressure differences in the level of the pressure which is built up by grooves in the axially offset fish-bone groove pattern.

16. The method of claim 15, further comprising, when the axial gas bearing is operated as an active gas bearing, adjusting the pressure level of the axial gas bearing independently of the pressure level of other gas bearings in the fan.

17. The method of claim 16, further comprising using gas from the pressure side of the fan as a pressure gas.

18. The method of claim 15, wherein the axial gas bearing comprises two or more stationary axial gas bearing faces, and further comprising, when the axial gas bearing is operated as an active gas bearing, increasing the pressure level of the axial gas bearing via openings in the two or more stationary axial gas bearing faces, each opening having a diameter up to 100 microns.

19. A method of operating a gas laser comprising a fan for circulating gas in the gas laser and having an axial gas bearing and a radial gas bearing, the method comprising:
  operating the radial gas bearing as a passive gas bearing and an active gas bearing, wherein the radial gas bearing comprises a stationary radial gas bearing face and a rotating radial gas bearing face that comprises an axially offset fish-bone groove pattern; and
  providing contact-free dynamic sealing via the rotating radial gas bearing face with respect to pressure differences in the level of the pressure which is built up by grooves in the axially offset fish-bone groove pattern.

20. The method of claim 19, further comprising, when the radial gas bearing is operated as an active gas bearing, adjusting the pressure level of the radial gas bearing independently of the pressure level of other gas bearings in the fan.

21. The method of claim 19, further comprising using gas from the pressure side of the fan as a pressure gas.

22. The method of claim 19, wherein, when the radial gas bearing is operated as an active gas bearing, increasing the pressure level of the radial gas bearing via openings in the stationary radial gas bearing face, each opening having a diameter up to 100 microns.

23. A device comprising:
  a gas laser; and
  a fan coupled to the gas laser and configured to circulate gas in the gas laser, wherein the fan comprises:

a shaft supported by the radial bearing and the axial gas bearing;

a radial bearing; and an axial gas bearing, wherein the axial gas bearing comprises:

two or more stationary axial gas bearing faces;

two or more rotating axial gas bearing faces, at least one of which is structured with a groove pattern, wherein the groove pattern comprises a first groove region and a second groove region separated by a radially central intermediate region devoid of grooves; and a plate, wherein at least two of the two or more stationary axial gas bearing faces are arranged at opposite sides of the plate.

24. The device of claim 23, wherein, with reference to the radially central intermediate region devoid of grooves, the distal groove depth exceeds the proximal groove depth in the first groove region or the second groove region or both regions.

25. A device comprising:

a gas laser; and a fan coupled to the gas laser and configured to circulate gas in the gas laser, wherein the fan comprises:

a shaft supported by the radial bearing and the axial gas bearing;

a radial bearing; and an axial gas bearing, wherein the axial gas bearing comprises:

two or more stationary axial gas bearing faces;

two or more rotating axial gas bearing faces, at least one of which is structured with a groove pattern; and a plate, wherein at least two of the two or more stationary axial gas bearing faces are arranged at opposite sides of the plate, wherein, with reference to the shaft, a distal groove depth of a groove in the groove pattern exceeds a proximal groove depth of the groove in the groove pattern.

* * * * *